May 11, 1965 R. STREIT 3,183,454

CIRCUIT FOR PROVIDING SEQUENCES OF PULSES AND INTERVALS

Filed April 24, 1961 3 Sheets-Sheet 1

Inventor
Rudolf Streit
By Stevens Davis Miller & Mosher
Attorneys

Inventor
Rudolf Streit
By Stevens Davis Miller & Mosher
Attorneys

Inventor
Rudolf Streit
By Stevens Davis Miller & Mosher
Attorneys 3,183,454

CIRCUIT FOR PROVIDING SEQUENCES OF PULSES AND INTERVALS

Rudolf Streit, Solothurn, Solothurn, Switzerland, assignor to Autophon A.G., Solothurn, Switzerland Filed Apr. 24, 1961, Ser. No. 139,559
5 Claims. (Cl. 331—113)

This invention relates to devices for producing control signals consisting of sequences of impulses and intervals and in particular to devices for telephone installations.

With automatic telephone installations the transmission of selection signals from a subscriber to the central office has from the beginning been ensured by means of a calling dial which produces impulses in the subscriber's line by interrupting the direct current flowing therein. With the standard signal transmission the signals transmitted operate the selection according to the number of impulses of said signals. This method of transmitting signals for a selection, for instance, is as simple as it is sure, but it has the drawback that it takes much time. It has accordingly already been tried to operate the selection by key pulsing, in order to reduce the time necessary for the selection. With some key-operated devices known in the art, each pressure on a key transmits an impulse to the central office. Installations with damped and undamped sound impulses as well as installations producing impulses by inserting various resistors between the wires of the subscriber's line or between this line and the ground have also been proposed. The devices of these installations have, however, several drawbacks. They are either too intricate or set too high requirements as regards both the manufacturing precision of their elements and the immutability of the latter in the course of time, or even depend too much on the line resistance to operate in a safe manner. The devices with resistors have also the drawback, in addition to that of most oftly requiring the use of the ground, that the signals produced in the substations cannot be transmitted by means of low-frequency transformers. It follows therefrom that with subscribers' installations in which the subscribers' circuits are not directly connected to the central office circuits, the direct selection from a substation to the corresponding central office can only be ensured by means of relatively intricate conversion devices. The conversion devices necessary for transmitting selection signals of such devices from the subscriber's line to a line transmitting only alternating current are also most intricate, since the alternating current transmission, for instance with a carrier, requires the use of a code which substantially differs from the direct-current code. None of the aforementioned devices could therefore be used in practice as yet.

The recent discovery of circuit element such as transistors and Zener diodes, however, enables the provision of installations or devices with which the production of selection signals no longer involves the aforementioned drawbacks.

It is accordingly an object of this invention to provide a device producing control signals, in particular for the transmission of a selection in telephone installations, by modifying a direct spacing current flowing through a line.

It is also an object of the invention to enable modifying said direct spacing current by reducing it to a substantial extent when impulses are to be produced and to arrange the device enabling that modification of the spacing current in such a manner, that sequences of impulses and intervals forming control signals can be generated.

Another object of the invention is to provide a device arranged for generating control signals consisting of sequences of impulses and intervals, in which one of said control signals is produced by a single operation of a contact.

A further particular object of the invention is to provide such a device with electronic circuit means generating impulse sequences, with further circuit means modifying the duration of the impulses, with still further circuit means modifying the duration of the intervals, and with contacts selectively actuating said circuit means and enabling the absorption of the impulses of a sequence which follow the first one.

Still further objects of the invention will become apparent in the course of the following description.

One embodiment of the device according to the invention is represented by way of example in the annexed drawings.

Figure 1:
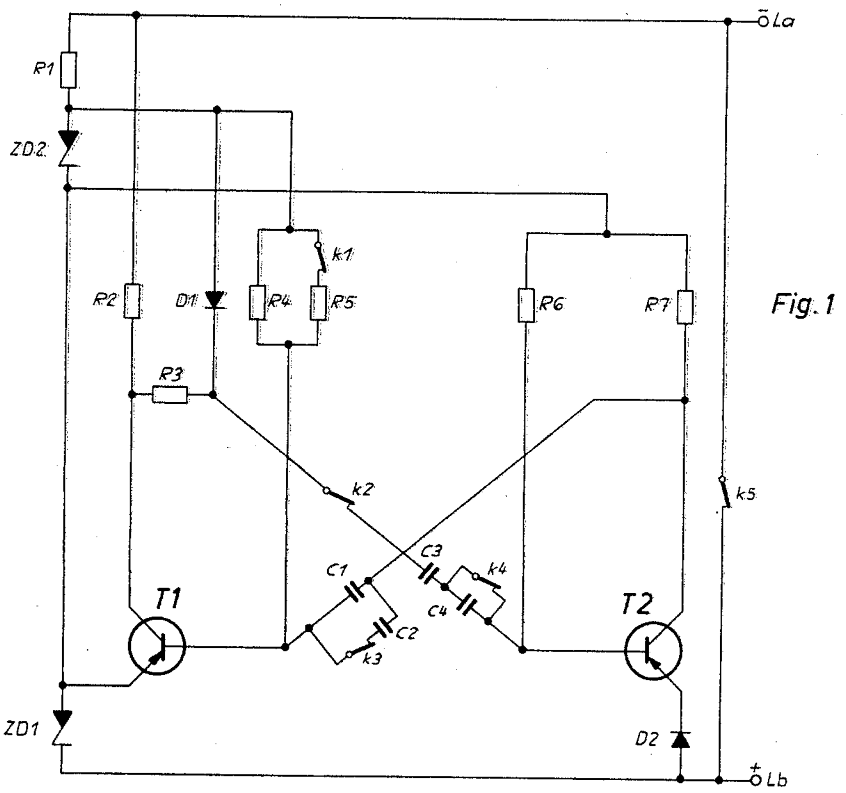
FIG. 1 shows the wiring diagram of said embodiment, in which the different circuit elements have been represented in the conventional manner, *k1*–*k5* representing thereby five contacts which can be opened by means of twelve keys (not shown) according to various combinations.
Figure 3:
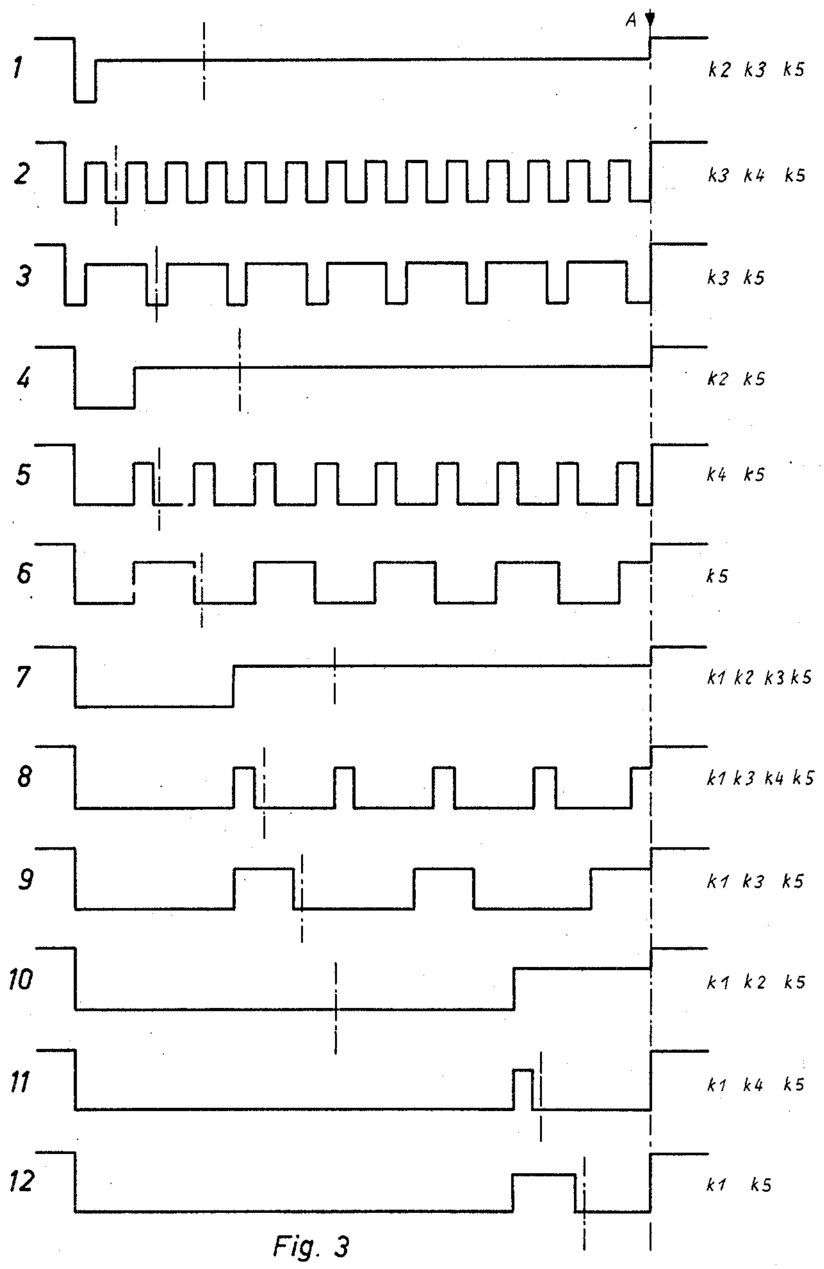
FIG. 3 shows the curves of the current flowing between terminals *La* and *Lb* of FIG. 1 during twelve different control signals which can be produced with the device represented in FIG. 1, the contacts of FIG. 1 which must be opened to produce each of said signals being indicated opposite to the corresponding curves.
Figures 4, 5:
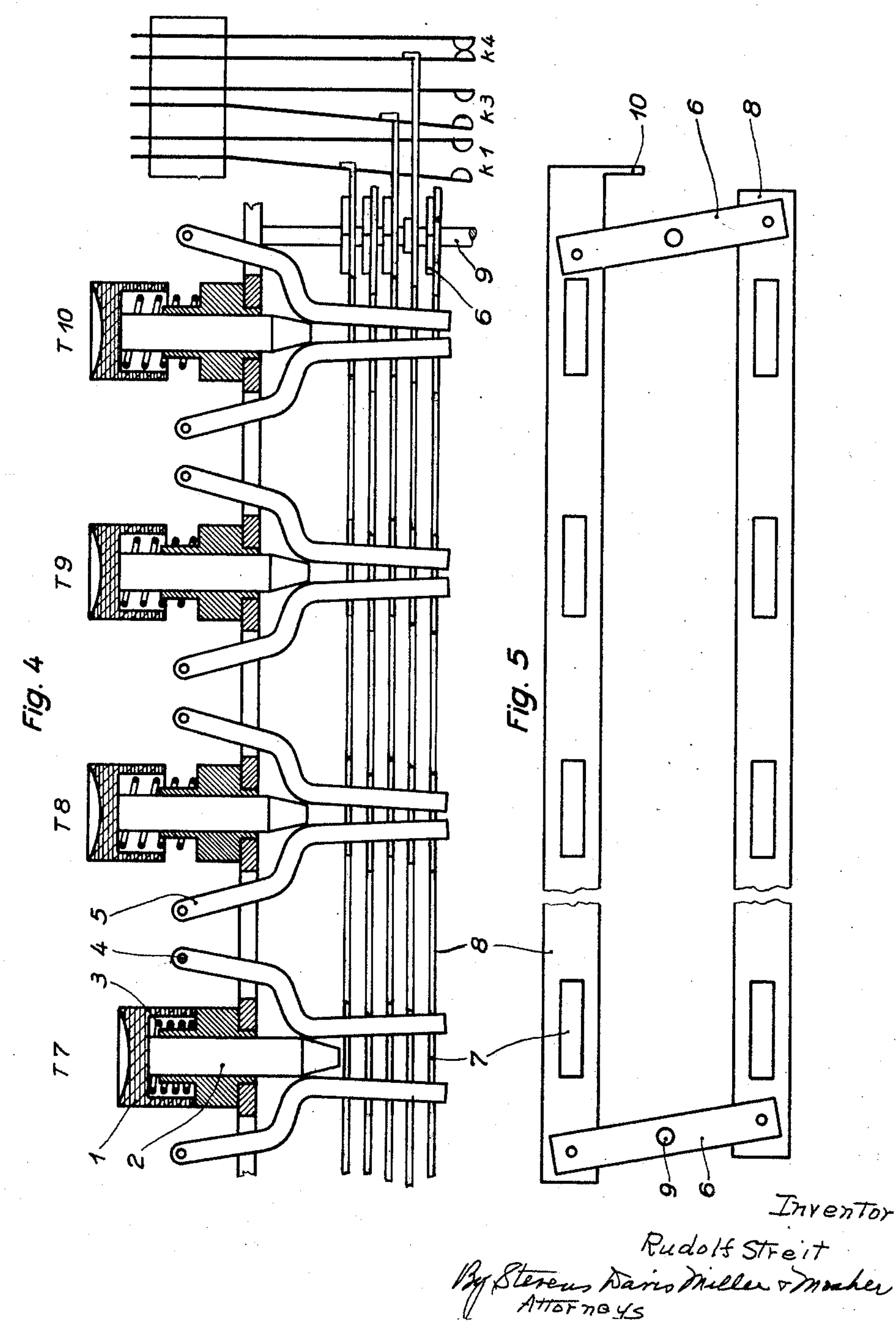

FIG. 4 diagrammatically shows a partial section of a keyboard device by means of which the contacts shown in FIG. 1 can be actuated as shown in FIG. 3;

FIG. 5 is a plane view of some parts of the keyboard device of FIG. 4.

The control signal generator, the connection of which is represented in FIG. 1, is normally short-circuited by contact *k5*. If this contact is opened the device according to the invention periodically opposes a great and a small resistance to the current flowing between terminals *La* and *Lb*, thus alternately producing great and small reductions of the spacing current flowing between said terminals. With the device represented in FIG. 1 it has been supposed that the terminal voltage is positive at *Lb* and negative at *La*, so that the spacing current flows from *Lb* to *La*. The above-mentioned great reductions of the spacing current will be called impulses hereinafter, while the small reductions of the spacing current will not be particularly differentiated from the static state. The time periods during which the spacing current is only submitted to a small reduction between two impulses will accordingly be called intervals hereinafter.

The device the wiring digram of which is shown in FIG. 1, will preferably be mounted in a subscriber's station instead of the usual calling dial device and twelve different keys will be provided to open the contacts *k1*–*k5* selectively, according to different combinations. The contact *k5*, which renders the device operative, will therefore have to appear in each combination and it will each time be the last to be opened. As with the usual calling dial devices the remaining circuit elements of the subscriber's station will preferably be short-circuited as long as contact *k5* is open. These remaining circuit elements and the contacts short-circuiting the same have not been represented in the annexed drawings since they do not form part of this invention.

As already mentioned hereabove, the device corresponding to the showing of FIG. 1 alternately produces impulses and intervals as long as a key is pressed and contact *k5* accordingly opened. The impulse width and the duration of the intervals will thereby depend on the contacts $k1$–$k4$ which will be opened. The device described enables producing impulses of four different widths and intervals of three different durations, one of the latter being equal to the time period during which the corresponding key is pressed, so that the impulses which should normally follow the first one, are then suppressed.

FIG. 3 shows the twelve possible control signals composed of impulse sequences which can be produced under the aforementioned conditions. Opposite each impulse sequence FIG. 3 indicates the contacts which have to be opened to produce the corresponding sequence. "A" indicates the time at which the key operating the different contacts is released. In each sequence a dot-and-dash line indicates the smallest period during which the sequence has to be produced in order that an evaluation device (not shown) may be able to evaluate said sequence. For this evaluation the first impulse and the first interval only are necessary. In case of a signal composed of a single impulse the shortest time period during which the key producing said signal has to be pressed, in order to enable a true evaluation of the signal, needs only be somewhat longer than that of the first impulse and of the following interval spacing said first impulse from the next one in a sequence composed of the longest possible intervals. The dot-and-dash lines thus indicate the shortest time period after which they key producing the corresponding control signal can be released to ensure a true evaluation of the signal. As shown in FIG. 3, this shortest time period is not the same in every case. With the three signals 10, 11 and 12, the corresponding key has to be pressed during the longest time. However, with signal 10 this time can be reduced to a value only somewhat longer than with signal 9, if signals 11 and 12 are not used, or if no confusion can occur between signal 10, on the one hand, and signals 11 and 12, on the other hand. Such a confusion is actually excluded if each of the signals 10, 11 and 12 is produced at a time at which the device evaluating said signals is only receptive either for signal 10, or for signals 11 and 12. The signals 1 to 10 are particularly suitable to transmit the selection number 1 to 0 from a subscriber's station to the central office, whereas the two remaining signals can be used to control operations as, for instance, reference calls, etc.

The widths of the impulses and intervals which can advantageously be used in practice, can, for instance, be chosen at 6 milliseconds, 15 milliseconds, 35 milliseconds, and 80 milliseconds for the impulses of signals 1 to 3, 4 to 6, 7 to 9 and 10 to 12, respectively. The intervals may have durations of 6 and 15 milliseconds. It has been observed with long impulses that those which follow the first one are somewhat shorter than said first impulse. This is obviously due to the fact that at the beginning of the second impulse and of the following ones, the circuit is not in exactly the same condition as at the moment at which the impulse sequence is started from the static state of the device. The small differences observed have, however, no influence on the evaluation of an impulse sequence since, as already stated above, the first impulse and the first interval only are considered during the evaluation. It can also be observed that the current during the intervals is not exactly the same as the spacing current. This is however immaterial, since an evaluation device can easily be manufactured so that it does not respond to said differences.

The impulses and intervals are produced in the device according to the invention by an astable multivibrator with two circuits having substantially different resistances. The two different modifications above-mentioned of the spacing current thereby correspond to both conditions of the multivibrator. Contacts $k1$–$k4$ enable modifying the time constant of the multivibrator and accordingly the widths of the impulses and of the intervals. As already mentioned hereabove, the device according to the invention enables producing in particular an interval lasting until the next sequence begins or, in other words, it enables absorbing all the impulses following the first one in a determined sequence.

Figure 2:
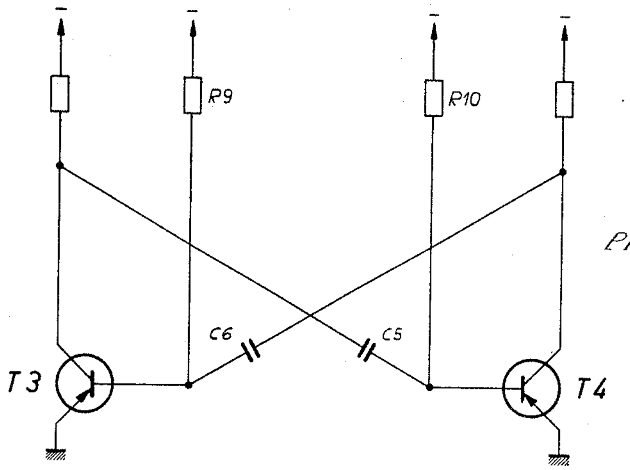
Fig. 2 PRIOR ART
FIG. 2 shows the prior art connection of an astable multivibrator for the purpose of illustrating the function of the device according to the invention.

The comprehension of the function of the device according to the invention supposes the knowledge of that of a conventional astable multivibrator. Although the function of such a multivibrator is well known to those skilled in the art, it will nevertheless shortly be recalled hereinafter with reference to FIG. 2 in view of the importance of this function for the comprehension of the invention. In the conventional multivibrator connection represented in FIG. 2 it is supposed that, at the beginning, transistor T3 is conductive and transistor T4 non-conductive. The collector and the base of transistor T3 thus have ground potential, the collector of transistor T4 a negative potential, and the base of this transistor a positive potential. The capacitors C5 and C6 are accordingly charged. In this condition, capacitor C5 discharges through resistor R10 and is somewhat charged with other polarity. As soon as the base of transistor T4 becomes negative, this transistor is conductive and its collector immediately is at ground potential thus producing a voltage jump in the corresponding circuit. The charge of capacitor C6, however, remains unmodified so that said voltage jump is transmitted to the base of transistor T3. This base accordingly becomes positive thus rendering transistor T3 non-conductive. The collector of this transistor accordingly becomes negative thus charging capacitor C5. With respect to the initial condition considered above, transistor T3 is now non-conductive and transistor T4 conductive. The charge and potential conditions of the circuits are reversed with respect to the initial conditions. In this reversed condition capacitor C6 discharges through resistor R9 so that the multivibrator will soon return to its initial condition. It follows from this description that the time elapsing between two relaxations depends on the time constant of the circuit elements R9, C6, on the one hand, and R10, C5, on the other hand, the first time constant thereby determining the time during which transistor T4 is conductive and the second time constant determining the time during which transistor T3 is conductive. In this conventional multivibrator circuit it will be noted that the emitter-collector circuits are connected in parallel between the two feeding points, minus and ground.

The device according to the invention is provided, as shown in FIG. 1, with an astable multivibrator of the type indicated above. In this multivibrator the time constant can be modified by means of contacts $k1$–$k4$ which add or suppress different capacitors and one resistor, thus enabling to selectively choose different combinations of time constants and accordingly to determine different time periods during which the transistors T1 and T2 are conductive. The device according to the invention has the particularity that its emitter-collector circuits are directly connected in series to one another. The emitter-collector circuit of transistor T1 has its collector connected through resistor R2 to terminal L*a* of the subscriber's line, and its emitter connected to a common junction of both circuits, and the emitter-collector circuit of transistor T2 has its emitter connected to terminal L*b* of said line and its collector connected through a resistor R7 to said common junction of both circuits. The multivibrator circuit comprising both emitter-collector circuits connected in series thus connects terminals L*b* and L*a* to one another through rectifier D2, transistor T2, resistor R7, transistor T1 and resistor R2. The emitter-collector circuit of transistor T2 is shunted by means of a Zener diode ZD1. The corresponding circuit of transistor T1 is correspondingly shunted by means of a resistor R1 and a Zener diode ZD2 connected in series in such a manner that resistor R1 is connected to terminal L*a*. Each emitter-collector circuit thus becomes an operating voltage through said diodes, even when the other emitter-collector circuit in series therewith is non-conductive. The arrangement described also provides for supplying the emitter-collector circuit of transistor T2 always with the same voltage, i.e. the Zener voltage of diode ZD1. Resistors R4 and R5, which connect the base of transistor T1 to a potential which is negative with respect to the emitter, i.e. to a potential similar to that of the collector, are connected to the potential existing between resistor R1 and diode ZD2, said potential being well determined with respect to the emitter of this transistor. As long as the feeding voltage lies above a predetermined minimum value, the voltages of the Zener diodes are constant, thus producing impulses and intervals having a constant duration.

Resistor R1 is chosen so great and resistor R2 so small as to enable the operation of the device described. These resistors can for instance be chosen to be 6.8 $k\Omega$ for resistor R1 and 1 $k\Omega$ for resistor R2. The voltages of the Zener diodes are similarly chosen different from one another, for instance 8 volts for ZD1 and 18 volts for ZD2, so that both emitter-collector circuits are supplied with quite different voltages. If transistor T1 is conductive, the current flows from terminal L*b* through the Zener diode ZD1, the transistor T1 and the resistor R2. This circuit has a relatively small ohmic resistance and the corresponding Zener diode also produces a small counter electromotive force, so that a large current may pass through said circuit. If, on the contrary, transistor T2 is conductive, the current passes through rectifier D2, transistor T2, resistor R7, Zener diode ZD2 and resistor R1. This second circuit has a relatively great ohmic resistance and the corresponding Zener diode also produces a strong counter electromotive force, so that only a small current can pass through this second circuit. It follows therefrom that the improved device described has two different total resistances according to the momentary condition of the multivibrator. As already pointed out above, these different resistances produce impulses and intervals in the subscriber's line the duration of which can be modified by changing the time constant of the multivibrator by means of contacts.

The impulse width can be modified by contacts *k*1 and *k*3. With respect to the combination represented in the drawings, in which both contacts are closed, the impulse width will be increased by opening contact *k*1, since the suppression of resistor R5 increases the operative resistance of the circuit and accordingly also its time constant, whereas opening contact *k*3 and correspondingly suppressing capacitor C2 produces a decrease of the operative capacity and accordingly also of the time constant. If R4 is for instance chosen with a resistance of 39 $k\Omega$, R5 with a resistance of 33 $k\Omega$, C1 with a capacity of 1 $\mu$f. and C2 with a capacity of 4 $\mu$f., openin gcontact *k*3 will produce an impulse of 6 milliseconds, closing both contacts *k*1 and *k*3 will produce an impulse of 15 milliseconds, opening both contacts *k*1 and *k*3 will produce an impulse of 35 milliseconds and opening contact *k*1 alone will produce an impulse of 80 milliseconds. Every combination of contacts *k*1 and *k*3 can thus be used.

To determine the duration of the intervals, the device according to the invention offers two possibilities depending on whether contact *k*4 is opened or closed. If R6 has, for instance, a resistance of 33 $k\Omega$, C3 a capacity of 0.5 $\mu$f., C4 one of 0.4 $\mu$f., the closed contact *k*4 produces an interval of 15 milliseconds. Opening contact *k*4, on the contrary, produces an interval of 6 milliseconds, because the capacitors C3 and C4 now connected in series reduce the operative capacity and accordingly the time constant. The device according to the invention offers a further possibility of modifying the duration of the intervals by opening contact *k*2. In this case the collector of transistor T1 is disconnected from the base of transistor T2 so that transistor T2 will no more become non-conductive at the end of an impulse, when transistor T1 is conductive. Both transistors will thus remain conductive. Since the Zener diode ZD1 shunting the emitter-collector circuit of transistor T2 keeps in any case the voltage constant, the conducting condition of transistor T2 has no influence on the total current passing through the device, because this transistor only reduces the current through the Zener diode ZD1. After an impulse produced by the initial conducting condition of transistor T2 while transistor T1 is non-conductive, no further impulse can follow when contact *k*2 is open. In other words, the device produces in this case a single impulse.

As already mentioned above the multivibrator becomes operative and produces impulses as soon as contact *k*5 is open. The other contacts, which determine the impulse and interval widths, have, however, to be actuated before contact *k*5 is opened, and to be set in the combination required for producing the desired impulse sequence. FIG. 3 shows that each signal always begins with an impulse, i.e. in the condition in which transistor T2 is conductive. In the device according to the invention this condition is ensured in a manner which will now be described. At the moment at which contact *k*5 is opened, all the capacitors of the device are discharged. A charging current flows however in the circuit base-emitter of transistor T2 through rectifier D2, emitter and base of transistor T2, capacitors C3 and C4 and resistors R3 and R2. This current causes transistor T2 to become immediately conductive. Its collector will thus have the positive potential of terminal L*b*. This potential is also that of the base of transistor T1, since capacitors C1 and C2 are not yet charged. Since the emitter of transistor T1 is supplied, by means of the Zener diode ZD1, with a voltage which is negative with respect to that of terminal L*b*, transistor T1 is non-conductive at the beginning of a control signal. Such a signal, produced by opening contact *k*5, will therefore always begin with an impulse.

Resistor R3 the function of which does not immediately appear, avoids a relatively slow reduction of the current at the beginning of an impulse. If this resistor R3 were omitted, a relatively important current would pass through the emitter and the base of transistor T2, the capacitors C3 and C4 and the small resistor R2, when transistor T1 becomes non-conductive, and this current would flow until said capacitors are charged, thus rounding off the first flank of the impulses. Resistor R3 reduces said current thereby involving however an increase of the charging time of said capacitors, but producing impulses which are more suitable for use in practice. The accordingly increased time period thus necessary until capacitors C3, C4 have been completely charged through resistors R2 and R3, however, exceeds the duration of the smallest impulse which it is possible to produce, so that the condition of charge of capacitors C3 and C4, when transistor T1 becomes conductive, and accordingly the length of the following interval would depend on the impulse width, if no particular measures were taken thereagainst. These particular measures consist in the provision of a rectifier D1, which connects the end of capacitor C3 directed towards the collector of transistor T1 to the potential existing between the Zener diode ZD2 and resistor R1. Because of its connection in the circuit, rectifier D1 limits the charging time of capacitors C3 and C4. As soon as the capacitor voltage has reached the added voltages of both Zener diodes, it can no longer increase, because both diodes are parallel-connected through rectifier D1 with respect to said capacitors. A current flows then through the Zener diodes, the rectifier D1 and the resistors R3 and R2. This condition is reached after a time shorter than that required for charging said capacitors until they have the line voltage. Moreover, the Zener diodes render the voltage to which said capacitors can be charged independent from the voltage of terminals L*a* and L*b*.

The rectifier D2 serves as a protection for transistor T2, since its inverse resistance and its maximal allowable inverse voltage are greater than those of the base-emitter circuit of the transistor. When the collector potential of transistor T1 jumps up at the end of an impulse, and when this increased potential is transmitted to the base of transistor T2, as already mentioned above, a potential difference is obviously produced between the base and the emitter of transistor T2 and this potential difference would indeed injure the transistor T2 in the absence of rectifier D2. Since this rectifier has a higher inverse resistance than the transistor, the voltage jump occurring at the moment considered above is almost entirely absorbed by the rectifier, thus protecting the transistor. Since the potential differences at the collector of transistor T2 are not as important as those at the collector of transistor T1, the potential difference between the base and the emitter of the transistor T1 is also smaller than that of transistor T2, so that a particular protecting rectifier need not be provided for transistor T1.

FIG. 4 shows a part of a key-board apparatus provided with twelve keys by means of which the five contacts of the device according to the invention can be actuated so as to produce the combinations indicated in FIG. 3. The keys of this apparatus are arranged on two rows each of six keys. FIG. 4 shows only the keys T7 to T10 of the first row which serve to produce signals corresponding to the figures 7 to 0, key T7 thereby being pressed. Each key comprises a head portion 1 and a shaft 2. A return spring 3 normally holds the key in its upper position. The lower portion of shaft 2 has been made conical so as to urge a pair of rocking members 5 pivoted at 4 away from one another, when the key is moved downward. Five bar systems are arranged below the keys and elongated slots 7 are provided in said bars so that rocking members 5 may extend therethrough. One of said bar systems is diagrammatically represented in FIG. 5. Each bar system is associated with one of said contacts and it comprises two parallel bars 8 connected to one another by a pair of links 6 pivotally mounted on shafts 9 so that bars 8 and be moved lengthwise to and fro. One of said bars (in the system represented in FIG. 5 the rear one) is provided with a projection 10 by means of which a contact (not shown) can be actuated. In order to actuate said contact the keys operating said bar system have either to move the bar 8 carrying projection 10 toward the left or the other bar 8 of the same system toward the right. The five bar systems are arranged above one another, as shown in FIG. 4. The contacts $k2$ and $k5$ (not shown) are actuated by rear bars, whereas contacts $k1$, $k3$ and $k4$ are actuated by fore bars. The slots 7 are formed so that pressing a key actuates only those bar systems which have to open the contacts corresponding to said key, and so that the rocking members 5 of the other keys enable the described motion of said bars. Each bar 8 actuated by a key to open a contact is accordingly moved either toward the left or toward the right according to whether the projection 10 is at the end of said bar or at the end of the associated bar of the same system. The bar systems have further to be arranged so that among all the contacts which have to be actuated contact $k5$ will always be the last to be actuated. If key T7 for instance is pressed as shown in FIG. 4, the contacts $k1$, $k2$, $k3$ and $k5$ have to be opened as indicated in FIG. 3. Now, it will be observed that the uppermost one of the five superimposed bar systems is arranged for actuating contact $k1$, the second one contact $k2$, the third one contact $k3$, the fourth one contact $k4$ and the lowest bar system contact $k5$. While contacts $k1$, $k3$ and $k4$ are actuated by fore bars, of said systems, contact $k2$ and $k5$ are actuated by rear bars thereof. Said rear bars extend behind the fore bars and the contacts $k2$ and $k5$ are correspondingly arranged behind the other contacts. These contacts $k2$ and $k5$ are, however, not represented in FIG. 4. As shown in FIG. 4, the depressed key T7 has caused the rockable members 5 associated thereto to move away from one another. During its rocking motion under the action of key T7, the left one of these rockable members pulls the first and the third bar toward the left, whereas the right rockable member similarly pulls the second and the fifth bar toward the right. The fourth bar is thereby not actuated. To obtain this result, this fourth bar needs only be provided below key T7 with a slot which is long enough to permit the rocking motion of members 5 therewithin. FIG. 4 shows that the two bars pulled toward the left open contacts $k1$ and $k3$. The two fore bars pulled toward the right as indicated above cause the left link members 6 (FIG. 6) jointed thereto to rock and to pull toward the left the rear bars of the corresponding systems so as to open contacts $k2$ and $k5$ in the same manner as contacts $k1$ and $k3$. The bars of the systems actuated by key T7 are provided, below the other keys, with slots which are long enough in order to permit the displacements described without any abutment of said bars against the rockable members 5 associated to the other keys. Moreover, the position of the fixed spring element of contact $k5$ is arranged so that this contact will always be the last to open when pressing a key.

When releasing a depressed key, the latter is pushed upward by its return spring 3 and the movable spring elements of the contacts, which have been actuated during pressing said key, pull the corresponding bar systems and bring them back to their resting position. Contact $k5$ is always the first to be closed when releasing a key. It will be observed that the bars described are only submitted to pulling stresses so that they cannot remain clamped as it usually occurs with similar apparatus in which bars are to be moved.

The device described above thus enables an easy production of signals or a connection operation. Said signals are produced by merely depressing a key. The device according to the invention has the particular advantage that with the impulse and interval widths indicated above, the keys have only to be pressed for 50 milliseconds, when operating the selection, and for 100 milliseconds when controlling said connection operations. It appears therefrom that these durations are so small that they do not limit the speed at which the keys can be operated in practice. The signals produced can be transmitted either through capacitors or transducers by means of a carrier. Their amplitude is quite different from that both of the voice signals and of the parasitic signals. Furthermore they can be transmitted through the same channel as the speech, so that their application appears to be sure and simple. The composition of said signals is most simple and they differ so much from one another that their evaluation is also very easy.

Although one embodiment of my invention has been described in detail with reference to the accompanying drawings, various modifications thereof will appear obvious to those skilled in the art without departing from the spirit of the invention or sacrificing the advantages thereof.

I claim:

1. A device including an astable multivibrator, for providing sequences of pulses and intervals, for periodically reducing a direct spacing current fed by a twin line, one being positive and the other negative with respect to ground, comprising: first and second transistors, each having base, emitter, and collector electrodes, the emitter electrode of said second transistor being connected to the positive one of said twin line; first and second resistive elements, one end of said first resistive element being connected to the collector electrode of said first transistor and one end of said second resistive element being connected to the collector electrode of said second transistor, the other ends of said first and second resistive elements being connected respectively to the negative one of said twin line and to a first junction; first and second capacitive means respectively coupling the base electrodes of said first and second transistors to the collector electrodes of said first and second transistors; lead means connecting the emitter electrode of said first transistor to said first junction; at least one first Zener diode connected between said first junction and said positive one of said twin line; a series circuit comprising third resistance element and a second Zener diode connected between the negative one of said twin line and said first junction, said series circuit offering greater impedance to the flow of current than said first Zener diode.

2. The device of claim 1, including a plurality of resistance elements connecting the base electrode of said first transistor to the junction between said second Zener diode and the said resistance element in series therewith.

3. The device of claim 1, including a substantially unidirectionally conducting element connected to the junction between the two elements of said series circuit and to the junction between said second capacitive means and the collector electrode of said first transistor.

4. The device of claim 1, including a substantially unidirectionally conducting element connected between the emitter electrode of said second transistor and the positive one of said twin line.

5. The device of claim 1, including a resistance element connected in series between the collector of said first transistor and said second capacitive means.

References Cited by the Examiner

UNITED STATES PATENTS

| | | | |
|---|---|---|---|
| 2,665,845 | 1/54 | Trent | 307—88.5 |
| 2,927,971 | 3/60 | Busala et al. | 179—90.3 |
| 2,951,911 | 9/60 | Van Lottum et al. | 179—90.3 |
| 2,994,864 | 8/61 | Van Allen | 340—347 |
| 3,016,469 | 1/62 | Barrett | 307—88.5 |
| 3,019,350 | 1/62 | Gauthey | 307—88.5 |
| 3,061,799 | 10/62 | Biard | 307—88.5 X |

FOREIGN PATENTS

| | | |
|---|---|---|
| 1,051,325 | 2/59 | Germany. |
| 1,058,131 | 5/59 | Germany. |
| 1,084,756 | 7/60 | Germany. |

OTHER REFERENCES

"A Versatile Character Generator With Digital Input," by Jones, IRE Wescon Convention Record, August 18–21, 1959, pages 16–19.

ROY LAKE, *Primary Examiner.*

ROBERT H. ROSE, JOHN KOMINSKI, *Examiners.*